United States Patent [19]

Freudenschuss et al.

[11] 4,052,126
[45] Oct. 4, 1977

[54] MOTION PICTURE CAMERA

[75] Inventors: Otto Freudenschuss; Gerd Kittag, both of Vienna, Austria

[73] Assignees: Karl Vockenhuber; Raimund Hauser, both of Vienna, Austria

[21] Appl. No.: 651,823

[22] Filed: Jan. 23, 1976

[30] Foreign Application Priority Data

Jan. 24, 1975 Austria .................................. 522/75

[51] Int. Cl.² ............................................. G03B 41/00
[52] U.S. Cl. ..................................... 352/84; 352/141; 352/171; 352/180
[58] Field of Search ................. 352/84, 180, 139, 140, 352/170, 171, 141

[56] References Cited

U.S. PATENT DOCUMENTS

| | | | |
|---|---|---|---|
| 3,567,317 | 3/1971 | Plummer | 352/140 |
| 3,589,805 | 6/1971 | Stimson | 352/171 |
| 3,784,292 | 1/1974 | Winkler | 352/171 |
| 3,825,329 | 7/1974 | Heinrich | 352/180 |

Primary Examiner—Monroe H. Hayes
Attorney, Agent, or Firm—Fleit & Jacobson

[57] ABSTRACT

A motion picture camera having a film transport mechanism driven by an electric motor having an electronic speed control circuit which may be controlled by the camera operator so as to modify the speed of the motor and consequently the film transport velocity for the selection of various picture frequencies or frames per unit of time both above and below a normal picture frequency for normal shooting thereby permitting both time lapse and slow motion photography during use, the motor speed control circuit permitting the motor to be returned to its normal film speed automatically, together with an automatic aperture control circuit and a picture frequency indicator which may be observed by the operator during the operation of the camera.

17 Claims, 9 Drawing Figures

MOTION PICTURE CAMERA

The invention refers to a motion picture camera with a film transport mechanism driven by an electric motor with an automatic aperture control circuit and with a preferably electronic speed control device for the electric motor of the film transport mechanism and in which the speed of the electric motor of the film transport mechanism and in which the speed of the electric motor of the film transport mechanism can be modified for the selection of various picture frequencies as compared to a normal picture frequency, and in which the selected picture frequency is indicated during the shooting of the motion picture.

BACKGROUND OF THE INVENTION

In general, motion picture cameras of this type present the possibility of being set for two or three running speeds, for instance for 9, 18, and 36 pictures/second. But, as a general rule, the picture frequencies must be set before any motion pictures are taken. This means that, in each case, a complete sequence can be shot only at a certain picture frequency.

Beyond this limitation, it was suggested earlier that a motion picture camera be designed in such a way that, upon operation of a handle, the camera will move the film at a speed higher than a certain standard film transport speed. However, this higher transport speed is maintained only as long as the handle is being operated. When the handle is released, the film will again be transported at the normal speed.

With the use of the first-mentioned, well-known motion picture camera, it is not possible during a sequence to shoot trick pictures, inasmuch as the motion picture camera does not offer any possibility of controlling the selected and/or adjusted picture frequency at every moment during the shooting. The second-mentioned, well-known motion picture camera makes possible only a preprogrammed shooting of slow-motion pictures of a certain frequency.

The basic problem solved by the invention is to produce a motion picture camera with which it is possible to take trick pictures that are dependent on various picture frequencies and, while accomplishing this, to avoid the disadvantages of the well-known motion picture cameras, so that a precise control of the picture frequency selected will be obtained.

SUMMARY OF THE INVENTION

Therefore it is proposed in accordance with the invention that in a motion picture camera of the type referred to above, two control devices are provided that are associated with the speed control device and bring about a modification of the speed and speed setting of the electric motor by way of electronic and/or mechanical time-constant members, in such a way that the extent of the change of speed is determined by the duration of operating the control devices. Preferably, a device for resetting the speed control to normal picture frequency and which may be actuated, preferably, through the release of the camera when the camera is stopped is provided and a picture frequency indicator is also provided which indicates the picture frequency selected, the indicator being observable by the user of the motion picture camera, at least during the shooting of the picture.

A further development of the invention comprises the use of key contacts for the control devices. The invention makes it possible merely to actuate a simple contact mechanism in order to alter the speed of the electric motor of the film transport mechanism after the desired modification of the speed has been chosen. This means that the user of the camera can concentrate completely on the object to be filmed, and that, in order to start trick shooting, he need only actuate the desired key in a simple way. As already mentioned above, the duration of the actuation of the adjusting device represents the extent of the modification of the speed. When the user of the camera releases the key upon obtaining the desired speed, the speed remains set for the speed established at the time of releasing the key. Such a setting or modification of the speed is considerably simpler than, for instance, the turning of a selector switch used for adjusting the running speed of cameras used heretofore. In addition, the continuously observable picture frequency indicator makes possible a precise adjustment of the desired speed.

DESCRIPTION OF THE DRAWINGS

Several embodiments of the invention are shown in the drawings by way of example in which.

Figures 1, 5, 6:
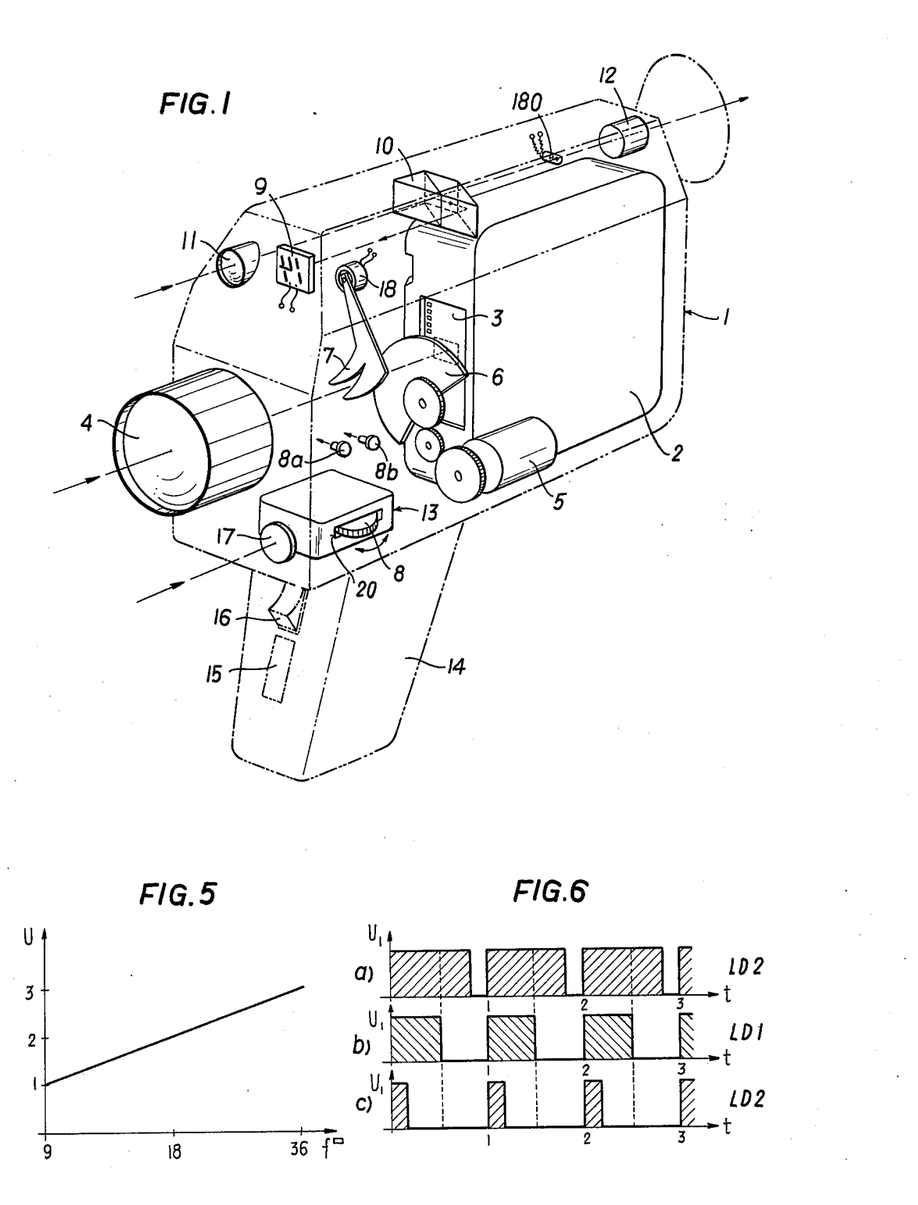
FIG. 1 is a persepctive view, partially in phantom of the invention.
FIG. 5 shows a voltage diagram pertaining to the circuit embodiments illustrated in FIGS. 2–4.
FIG. 6 is a voltage diagram pertaining to the current embodiment of FIG. 4.

Referring now to FIG. 1, the numeral 1 designates a motion picture camera for use with a film 3 which is contained in a cassette 2. The camera 1 is provided with a photographic lens 4. The film 3 in cassette 2 is transported by an electric motor 5 and a sprocket drive which is not shown. A rotary shutter 6, also driven by motor 5, and an adjustable diaphragm 7 are mounted between the lens 4 and film 3. By means of an adjustment device including a small adjusting wheel 8, the running speed of the electric motor 5, and consequently also the speed of transporting the film 3, or the running speed of the rotary shutter 6, can be altered and adjusted at all times before the release is actuated. In addition, the transport speed that is, the picture frequency, may also be modified and/or adjusted by depressing keys 8a and 8b. It is possible by means of key 8a, to increase the running speed of the electric motor during the shooting of pictures, and by means of key 8b to reduce that speed during shooting. Consequently the picture frequency may be pre-selected by means of the adjustment wheel 8 before the beginning of shooting, and it may be modified by means of keys 8a and 8b during shooting, so as to achieve slow-motion effects, or time lapse effects, compared to a normal picture frequency. The transport speed of film 3, that is, the picture frequency, is indicated by means of the indicating device 9. The optical display of indicator device 9 is guided into the path of rays of the viewfinder lens 11, by means of an optical deflecting system 10. Thus the user is able to observe, through the eyepiece 12, the object to be photographed as well as the running speed of the motion picture camera 1 at the same time.

For control or adjustment of the shooting parameters, the camera is provided with an electronic system 13. This electronic system 13 consists largely of electric circuits for adjustment of the diaphragm, for control of the running speed of motor 5, and for indication of the picture frequency with the electro-optical indicator device 9.

The handle 14 of the motion picture camera 1 has a handhold 15, provided at least with means for activation of the diaphragm device and a release lever 16 for starting the operation of the driving motor 5. In addition, the power sources (not shown) for supplying power to the electronic devices of the motion picture camera 1 may be housed in the handle 14.

To control the exposure, a photoelectric cell preferably a photoconductive cell has been added to the electronics system 13 of the camera. Diaphragm 7 is adjusted by means of a galvanometer 18 which is connected to the electronic system 13. In order to indicate to the user of the camera that the brightness of the scene as received by the photoelectric cell is insufficient for shooting a motion picture, an optical signal source 180 has been mounted in the path of the rays of the viewfinder lens 11. This signal source 180, through the electronic system, warns the user against incorrect exposures.

Figure 2:
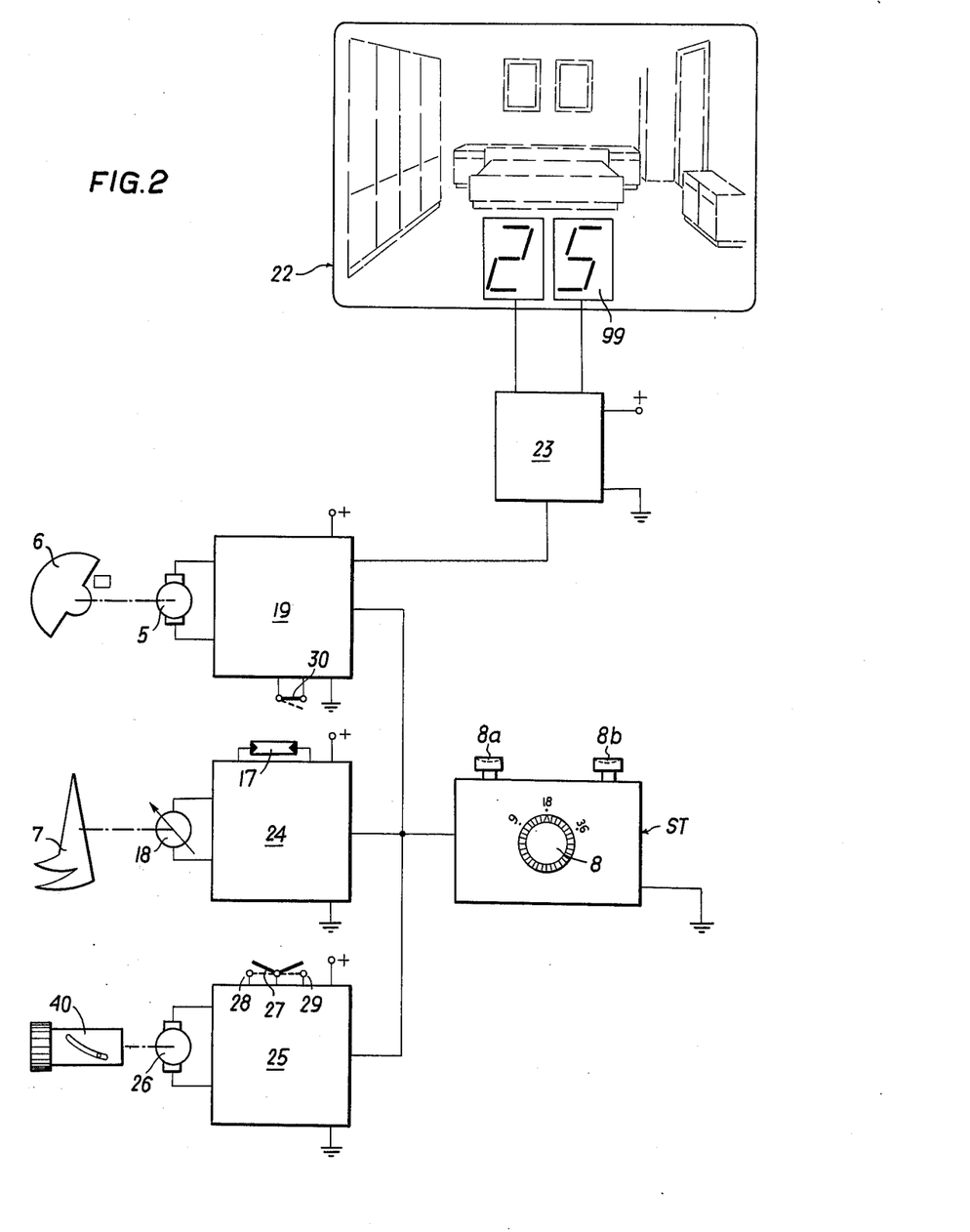
FIG. 2 presents a block diagram of the electronic circuit of the motion picture camera of FIG. 1 together with a digital display of the picture frequency.

FIG. 2 is a block diagram of a first embodiment of the the electronic circuit of the camera for the shooting of trick film. Drive motor 5 for transporting the film and for driving the rotary shutter 6 is connected with the output of a speed regulating device 19. This speed regulating device 19 automatically controls the running speed of motor 5, in accordance with the amplitude of the control signal which it receives. In other words, the amplitude of the control signal determines the running speed of motor 5, and that speed will then be maintained constant by means of the speed regulating device 19. When the amplitude of the input signal is modified, the transport speed of the film and the running speed of the rotary shutter 6 will change also, in the same direction. In order to set the desired speed of rotation, a control signal output ST has been provided. Such speed regulating devices 19 are well-known and generally comprise a reference step for the signal as determined by the setting of the control signal output, a signal derived from the speed of the motor 5 at any given point in time (nominal speed/actual speed), and a switching arrangement located in the power supply line for the motor 5, which is actuated in accordance with the output signal of the reference step.

The control signal output ST includes the adjustment wheel 8 which is connected mechanically with the brush of an adjustable resistance. The wheel 8 projects through a recess or similar opening in the camera housing. When the arrow on the adjustment wheel 8, or the brush of the adjustable resistance (not shown) is located, in the region of the notch "18" provided in the center of the dial, then the control voltage that produces a running speed for motor 5 corresponding to a normal picture frequency of 18 pictures/second is fed as a control signal to the speed regulating device 19 by means of the adjustable resistance (not shown).

When the user of the camera wants to shoot trick pictures, which are obtained by a picture frequency that deviates from the normal picture frequency, he can do so before actuating the release by moving the adjustment wheel 8 from its central position (notch "18") to the left or to the right. Moving the adjustment wheel 8 to the left brings about a reduction in the output signal for the speed regulating device 19. This in turn results in the shooting of pictures at a lower picture frequency for instance, at a minimum rate of 9 pictures/second. When a motion picture film is projected at a normal picture frequency (18 pictures/second), then the sequence projected shows a time-lapse picture. Moving the adjustment wheel 8 to the right brings about a higher rate of picture frequency for instance, up to a maximum of 36 pictures/second, as compared to the normal picture frequency which therefore produces a slow motion picture of the scene with respect to time. It is therefore possible, by simply turning the wheel 8, to alter the action timing with respect to its projected reproduction.

In addition, the adjustable resistance (not shown) can be operated by means of the keys 8a and 8b during the shooting. These keys make it possible also to turn the adjustment wheel 8, and thereby modify the transport speed of the film. Various designs of the control signal output ST will be described, in greater detail, in the examples to follow.

However, it may be necessary for the user of the motion picture camera to be able to simply and clearly oversee the shooting of trick pictures. To that end, an electro-optical indicating device 99 has been provided, which can be observed at the same time as the viewfinder image 22. This electro-optical indicating device 99 consists in the circuit of FIG. 2 of digital displays which are controlled by a frequency counter 23. The frequency counter 23 evaluates the picture frequency as determined by the running speed of the motor 5. The number of voltage impulses on the collector of motor 5 may be used as a counting frequency. Similarly, it is possible to provide an eccentric cam that activates at predetermined periods a circuit breaker point on the shaft of the motor 5 and/or on rotary shutter 6. The switching frequency of the circuit breaker can then be used to determine and report picture frequency.

In the viewfinder image in accordance with the embodiment of FIG. 2, a picture frequency of "25" is indicated. This means that, when the film is run at the normal picture frequency of 18 pictures/second, a slow-motion effect will be achieved. It is also possible to design the frequency counter 23 in such a way that the picture frequency is not indicated directly, but that the ratio of the slow-motion frequency or of the time-lapse frequency to the normal picture frequency will be indicated in which case reference can be made to a projection of the film at normal picture frequency at the same time. Instead of 18 pictures/second, "1.0" is indicated in the viewfinder. Then, depending on the setting of adjustment wheel 8 or on the actuation of keys 8a, 8b, displays of "0.5" and "1.8" will be indicated in case of slow motion or time-lapse frequencies respectively.

In cameras in which the drive of the shutter is rigidly connected with the drive of the film transport and/or with the driving motor, the exposure time is proportional to the running speed of the motor and therefore the rotary shutter 6 in accordance with FIGS. 1 and 2. This makes it necessary, in the case of cameras of the aforementioned design, to take the exposure time into consideration when setting or adjusting the shutter. An increase in the picture frequency over the normal picture frequency requires a shorter exposure time. Therefore it is necessary, in order to expose the film properly, to open the diaphragm more widely proportionally. A reduction of the picture frequency during shooting below the normal picture frequency, requires a longer exposure time for the film. In this case the diaphragm aperture must be reduced, commensurate with the reduction in the running speed.

In accordance with the embodiment shown in FIG. 2, a diaphragm control circuit 24 has been provided for the control of diaphragm 7. This circuit 24 has a photoconductive cell 17 to sense the brightness of the scene. A galvanometer 18 is connected with the diaphragm control circuit 24 for adjusting diaphragm 7. This control circuit may have a Wheatstone bridge, in one branch of which a photoresistance has been mounted. To ensure the proper exposure of the film when different picture frequencies are used, the control voltage for the speed control device 19, which is dependent on the position of the adjustment wheel 8, is fed also to diaphragm control circuit 24. If a Wheatstone bridge is used, as described above, the control voltage obtained by the adjustable resistance (not shown) may be locked into the bridge in such a way that the turning of the wheel 8 will bring about higher picture frequencies, while the actuation of one of the keys will effect an opening of the aperture in diaphragm 7.

In addition, it may be necessary to modify also the electro-mechanical setting of the focal length of a pancratic photographic lens 40 with reference to the picture frequency. Adjustment 25 for lens 40 consists of a tachometer for the electric motor 26 which, sets the focal length of lens 40 via a friction gear (not shown). The tachometer 25 may be switched in by means of a switch 27. Switch 27 has been designed, as shown in FIG. 2, as a switching lever, which in a neutral position blocks the voltage supply of motor 26, and in one of its operative positions 28, 29, depending on its selection, causes the motor 26 to run clockwise or counterclockwise. To prevent a situation in which a film taken at other than normal frequency and projected at normal frequency shows undesirable and especially abrupt changes in focal length (enlargement or reduction of the object), the speed of motor 26 is altered correspondingly by turning adjustment wheel 8 or depressing keys 8a, 8b. At the same time the control voltage for the speed control device 19 is also used to control the tachometer 25 of the electro-mechanical adjustment of the focal length of lens 40. The tachometer 25 is designed advantageously so that any speed-up of the driving motor 5 also increases the speed of motor 26, causing a rapid adjustment of the focal length.

By means of the adjustment devices (wheel 8, keys 8a and 8b), it is therefore possible to control the picture frequency, the diaphragm setting and, if need be, the device for adjustment of the focal length of the photographic lens. When the user looks at the viewfinder picture, he is able to follow the trick film sequence clearly.

A positive voltage potential is fed to the electronic components 19, 23, 24, 25 via a connection marked by a plus sign, while a negative voltage potential goes to the ground connections. The release mechanism of the motion picture camera, designated by 30, may be actuated by the release knob 16, as in FIG. 1.

Figure 2A:
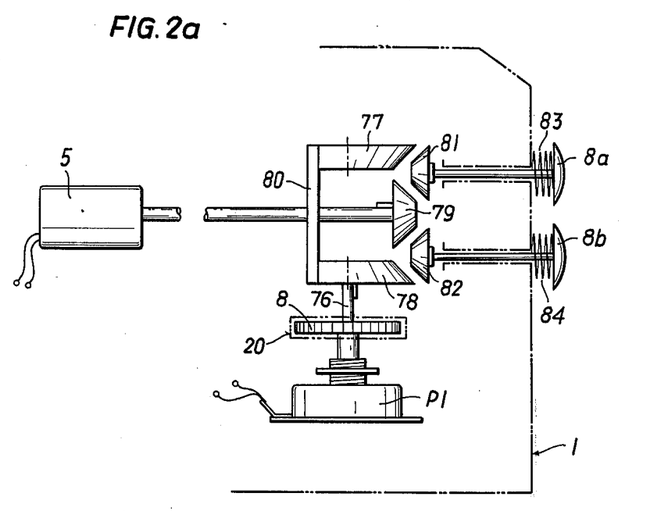
FIG. 2a shows an electro-mechanical arrangement incorporated in the camera of FIG. 1.

In accordance with FIG. 2a, the control signal display ST as shown in FIG. 2 is provided with a potentiometer P1. The brush contact of the potentiometer P1 is fixedly secured to shaft 76. In addition, two friction wheels 77, 78 in the shape of segments, are securely fitted on shaft 76. The friction wheels 77, 78 are preferably in the form of bevel gear wheels. A friction wheel 79, driven by the film transport motor 5, is associated with the friction wheels 77, 78, while the friction wheels 77, 78 have been mounted concentrically and separated by intervals. Friction wheel 79, driven by motor 5, is located between the two friction wheels 77, 78 within range of their peripheral surfaces. The two friction wheels, 77, 78 are rigidly connected by a cross-piece. In order to adjust the brush contact of the potentiometer P1, it is necessary to transmit the moment of rotation from the friction wheel 79, to one of the friction wheels 77, 78. In order to obtain clockwise and counterclockwise rotary motions of shaft 76, two additional friction wheels 81, 82 have been provided to form a revolving clutch between friction wheel 77 and the driven friction wheel 79 and also between friction wheel 78 and the driven friction wheel 79.

The friction wheels 81, 82 are mounted in such a way that they may rotate freely, and may be displaced axially into a coupling position between the friction wheels 77, 79 and/or 78, 79, by use of control keys 8a and 8b. Depending on the desired adjustment of the contact (not shown) of the potentiometer P1, keys 8a or 8b must be actuated during the shooting of the film. After the keys have been released, the contact of the potentiometer P1 and the arrangement of the friction wheels 77, 78 remain in their rotated positions, since the friction wheels 81, 82 which bring about the transfer of torque, are moved by tension springs 83, 84 out of their position of engagement.

Turning the contact of the potentiometer P1 produces a variable voltage on its connections and this voltage is fed as a control voltage to the speed regulating device 19 and to the other electronic regulating devices, as in FIG. 2.

It is possible, therefore, when releasing the motion picture camera, to obtain the desired resistance value of the potentiometer P1, after simply depressing keys 8a or 8b, to rotate shaft 76 by means of the torque derived from the film transport motor 5.

As described above, the control voltage determines the speed of the driving motor 5, and therefore the picture frequency.

In order, however, to enable the user to adjust the picture frequency even when the driving motor 5 is not switched on, the adjustment wheel 8 is rigidly connected to the shaft 76 of the potentiometer P1. This adjustment wheel 8 projects through a recess 20 in the casing of the camera 1 and may be moved by the user from the outside. With the aid of the marks placed on the camera casing, it is therefore possible to set the picture frequency in a simple manner when the driving motor is at a standstill.

Figure 2B:
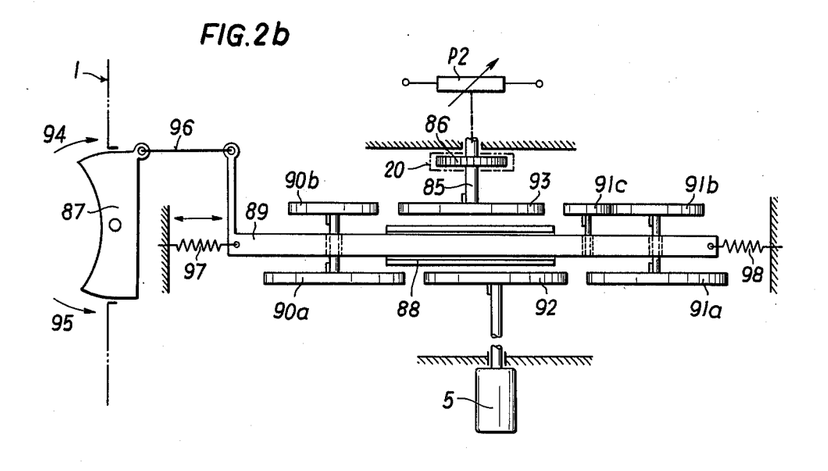
FIG. 2b shows another electro-mechanical arrangement for the camera of FIG. 1.

In accordance with FIG. 2b, a potentiometer P2 is again used, and its setting produces a signal which determines the speed of the film transport motor 5. Shaft 85 is connected with the contact of the potentiometer P2. The shaft 85 is provided with an adjustment wheel 86 for adjusting the contact of the potentiometer P2.

In addition, the contact of the potentiometer P2 can be adjusted by mechanical drive. To this end, a friction gear train has been provided which may be operated by the switching lever 87. This switching lever 87 moves a sliding carriage 89 which is mounted in a stationary slideway 99, and supports two pairs of friction wheels 90a, 90b and 91a, 91b mounted on it so as to be freely rotatable. Each pair of friction wheels 90a, 90b, and 91a, 91b is arranged to provide for selective transmission of the torque from the film transport motor 5 to shaft 85 of potentiometer P2. This is accomplished by a friction wheel 92 fixedly mounted on the shaft of the film transport motor 5. Shaft 85 of the contact of the potentiometer P2 is similarly connected and is provided with a fixedly mounted friction wheel 93.

The pairs of friction wheels 90a, 90b or 91a, 91b, which rest on the siding carriage 89, have been mounted at a distance from each other greater than the diameter of the friction wheel 92 which is connected with the motor shaft. Similarly the distance between friction wheels 90a, 90b, or 91a, 91b, which are arranged in pairs, is greater than the diameter of friction wheel 92 that is connected with the potentiometer shaft 85.

Each of friction wheels 92, 93 is mounted between the pairs of friction wheels 90a, 90b, and 91a, 91b. When the user of the camera actuates the lever 87 in either one of the directions of the arrows 94, 95 shown in the drawings, while the driving motor 5 is switched on, the sliding carriage 89 will be displaced by way of the toggle 96, and the friction wheels 90a or 91a, in accordance with direction of displacement of the sliding carriage 89 will move into engagement with the moving friction wheel 92. In the same way, a friction wheel driven either by friction wheel 90a or 91a, engages a friction wheel 93 which is connected to potentiometer shaft 85. On one hand, this friction wheel will be 90b. On the other hand, it will be a friction wheel 91c that is always coupled with the friction wheel 91b and has been provided for producing a reverse rotation.

The design of the friction gear train as described above makes it possible, therefore, that any desired picture frequency may be set once the camera is released (film drive motor 5 switched on) and when the lever 87 of the potentiometer P2 is appropriately actuated to obtain the control voltage. The adjusted picture frequency set at the time will be retained after the lever 87 is released, since the springs 97, 98 shift the sliding carriage again, in such a way that the friction wheels will be disengaged. When the driving motor 5 is deenergized (camera not released), the picture frequency can be set or preselected by means of the adjustment wheel 85 which projects through the slit 20 in the camera housing 1.

Figure 3:
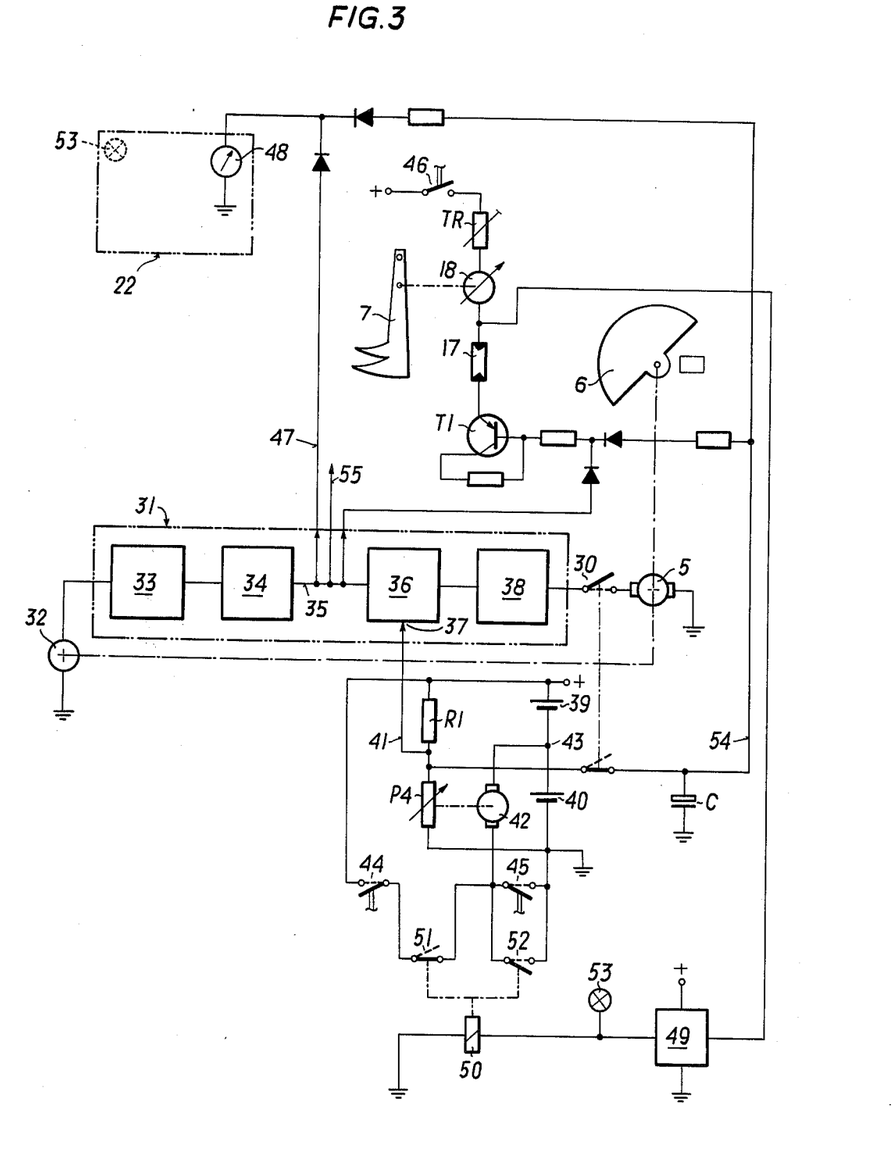
FIG. 3 shows a second embodiment of a block diagram of the electronic circuit incorporated in the camera of FIG. 1 the picture frequency being indicated on a dial.

FIG. 3 shows a second embodiment of a switching arrangement for the performances of trick photography (slow-motion, time-lapse). The speed control device of the electric motor 5 has been designated by 31. Motor 5 in turn drives a rotary shutter 6 and the film. In addition, a tachogenerator 32 is fixedly connected with the driven end of the shaft of electric motor 5; and delivers an AC voltage at a frequency which is directly proportional to the speed of the motor 5. The signal of the tachogenerator is transformed, in a pulse-shaper stafe 33, into a square-wave having a constant amplitude. The output signal of the pulse-shaper stage 33 is conducted to a voltage frequency converter 34, the output 35 of which now provides the actual voltage in accordance with the motor speed. The actual voltage is compared with a nominal voltage in a comparison step 36. The nominal voltage as obtained in the comparison step 36 is conducted to a pulse amplifier 38 which switches the motor on or off, in order to achieve a constant speed as determined by the nominal voltage.

The desired speed of the driving motor 5 is achieved by adjustment of a potentiometer P4. This potentiometer P4, together with a resistance R1, forms a voltage divider that is connected with two batteries 39, 40 connected in series. At the pick-up of the voltage divider P4, R1, the nominal voltage for the input 37 of the speed regulating device 31 may be tapped. By adjusting potentiometer P4, it is possible therefore to adjust and set the desired speed of the driving motor 5.

According to the embodiment of FIG. 3, the adjustment of the contact of potentiometer P4 takes place by means of a servomotor 42. The servomotor 42 is connected, via one of its terminals, with the center post 43 of the two batteries 39, 40. The other terminal of the servomotor 42 may be connected alternatively by way of key switch 44 to the plus terminal of the batteries 39, 40 or by way of key switch 45 on the minus-terminal (ground) of the batteries 39, 40. The servomotor 42 may thereby be driven clockwise or counterclockwise, depending on the wish of the user. Consequently the nominal voltage that corresponds to the desired speed of the driving motor 5 may be set by means of the coupling of the drive of servomotor 42, via a transmission gear (not shown), to the contact of the potentiometer P4, by actuation of the switches or keys 44, 45, on the tap 41 of the voltage divider R1/P4.

As described above for the embodiment of FIG. 2, it is necessary also to control the exposure regulating device, in accordance with the transport speed of the film. The exposure regulating device in accordance with FIG. 3 consists largely of a photoconductive cell 17 which is exposed to the brightness of the scene and which has been mounted in series with a galvanometer 18 for adjustment of the diaphragm blade 7. One terminal of the photoconductive cell is connected with the negative pole of the voltage supply (batteries 39, 40), by way of the emitter-collector of transistor T1. One terminal of the galvanometer 18 is connected with the positive pole of the power supply by way of the adjustable resistance TR. The adjustable resistance TR is used, for adjustment in accordance with the sensitivity of the film. The exposure regulating device is activated by means of the switch 46.

The base electrode of transistor T1 will receive a voltage corresponding to the actual speed of the driving motor 5 as the control voltage for the resistance formed by the emitter-collector path of transistor T1. To that end, the output 35 of the frequency/voltage transformer 34 of the speed-regulating device 31 is connected with the base electrode of transistor T1 by way of a resistance. A high picture frequency requires a wider opening of the diaphragm 7 than for normal picture frequency, inasmuch as the high speed of the rotary shutter 6 causes a shorter exposure time. The increase of the actual voltage at the output 35 of the frequency/voltage converter requires an increase in the resistance value of the emitter-collector path of transistor T1, so that the flow of current through the photoconductive cell 17 is reduced for the same brightness of the scene, the same as when shooting at normal picture frequency and the flow of current is reduced thereby causing diaphragm 7 to open. When the driving motor 5 is set for a speed that brings about a lower picture frequency than normal, the lower voltage at the output 35 of the frequency/voltage converter diaphragm 7 to open, since the actual voltage, being lower than the voltage at normal picture frequency, reduces the resistance value of the emitter-collector path of transistor T1 thereby increasing the flow of current through the photoconductive cell 17.

In addition, the actual voltage at the output of the frequency/voltage converter is led, via lead 47 to a galvonometer 48 that has been designed as an indicator. This galvanometer 48 has a scale graduated in picture frequencies, which is visible in the viewfinder image 22 by the use of mirrors. Because the picture frequencies have been made visible, the user of the motion picture camera will be able to clearly observe the actual speed of the driving motor 5 and the picture frequency selected by him during the shooting.

When the objective is a high picture frequency (slow-motion), it may happen that, due to insufficient brightness of the scene, an appropriate exposure of the film cannot be achieved, since diaphragm 7 has been opened completely even before the desired high picture frequency was reached. To prevent such unsuccessful (underexposed) takes, a speed limiting device has been provided for the driving motor 5. This speed limiting device prevents any increase in the speed of the driving motor when a certain diaphragm aperture (complete aperture of the diaphragm) has been reached. To that end, a threshold value switch 49 is connected with the photoconductive cell 17. The threshold value switch 49 activates the relay 50, when a flow of voltage appears within the diaphragm regulating circuit indicative of the largest aperture of the diaphragm. The relay 50 has a spacing contact 51 and an operating contact 52. The spacing contact 51 is arranged in series with the key switch 44, and the operating contact 52 is arranged parallel to the key switch 45, both within the circuit of the seromotor 42 for the potentiometer P4. When a voltage that would require an aperture of the diaphragm 7 beyond its maximum aperture, this voltage appears in the exposure regulating circuit on the photoconductive cell 17 and relay 50 will be excited, so that the servomotor 42 which is driven by the user by way of the switch 44, will be stopped by means of the contacbreaker 51. Inasmuch as the servomotor 42, in that case, may still have shifted the potentiometer P4 to an extent such that the picture frequency is still excessively high, the motor will be driven in the opposite direction by way of the operating contact 52 of the relay 50; bringing about a reduction in the speed of the driving motor and, consequently, of the picture frequency. In this way, a sufficient exposure time of the film is reliably ensured. The reduction of the picture frequency also requires a modification of the voltage ratios within the exposure regulating circuit, so that the threshold value switch 45 will be reversed and will de-energize the relay 50.

Beyond the eventuality, it may happen that during a sequence, wherein quich zooming is used, the brightness of the scene is reduced to such an extent that the high speed of the driving motor 5 must not be maintained, because under-exposure may occur. For example when during the shooting there is insufficient brightness of the scene, without any modification of the high picture frequency by the user of the camera, the threshold value switch 49 will be reversed automatically by the exposure regulating circuit, and the relay 50 will be excited causing the closing of contact 52, shutting off the circuit of the servomotor 42 in such a way that the picture frequency will be reduced to the point when ad adequate exposure can be again obtained. When the speed of the driving motor 5 and therefore the picture frequency has been reduced to the point when a sufficient exposure time is achieved once more, the threshold value switch 49 will reverse itself again and deenergize the relay 50, and/or the circuit of the switch 52 will be opened again.

In order to alert the user to the fact that the high picture frequency desired by him must not and/or cannot be used, a signal lamp 53 is connected to the output of the threshold value switch 40. This signal lamp 53 is, by way of example, also visible in the viewfinder picture 22.

Inasmuch as the control of the exposure regulating circuit and/or of the picture frequency display that is, the galvometer 48 is accomplished by the actual voltage as determined by the speed of the driving motor 5 at the output of the frequency/voltage converter 34, the user, with the circuitry described above and when the driving motor 5 is not running, that is, when the release knob 30 of the camera has not been activated, cannot receive any indication either of the picture frequency or of the diaphragm aperture assigned to that frequency. The actual voltage on the output of step 34 will then be zero. In order, however, to enable the user to preselect the picture frequency and to determine the corresponding diaphragm aperture, the nominal voltage for the speed control device 31 is fed, through lead 54 to the control electrode of transistor T1 and to galvanometer 48. Consequently, when switch 46 of the circuit regulating the exposure is closed by the user, and when a certain picture frequency is set by using key switches 44 or 45, the diaphragm control circuit will be influenced by the voltage at the tap of voltage divider R1/P4 with respect to the picture frequency set and the galvanometer will indicate the picture frequency. When the user of the camera now actuates the release switch 30, the required voltage will be supplied to the driving motor 5, and the supply of nominal voltage to the diaphragm regulating circuit and to the galvanometer 48 will be interrupted. At this time, the actual voltage at the output 35 of the frequency/voltage converter will assume the control of the diaphragm regulating circuit and the galvanometer 48.

In order to prevent any failure of the control voltage for the diaphragm regulating circuit and for the galvanometer 48 during the actuation of release lever 30, a condenser C, designed as a storage unit, has been connected with the lead 54. This condenser C has been selected in such a way that its charge will be maintained only for the period during which the release lever 30 is actuated, supplying the nominal voltage to transistor T1 and to galvanometer 48 through the lead 54.

To actuate key switches 44, 45, a spring-loaded switching lever has been suitably provided whereby these keys can only be operated alternately. In addition, the control input of a tachometer (not shown) for the electro-mechanical drive of the device for adjusting the focal length of the lens may be connected to the lead 55. This lead 55 carries the actual voltage, that is, a voltage that corresponds to the picture frequency. The tachometer (not shown) should be designed so that a low voltage at its control input causes a slow adjustment of the focal length of the lens.

The diodes shown in the voltage supply conductors connected to the transistor T1 and to the galvanometer 48 are used for the mutual uncoupling of the conductors and for similar purposes.

Figure 4:
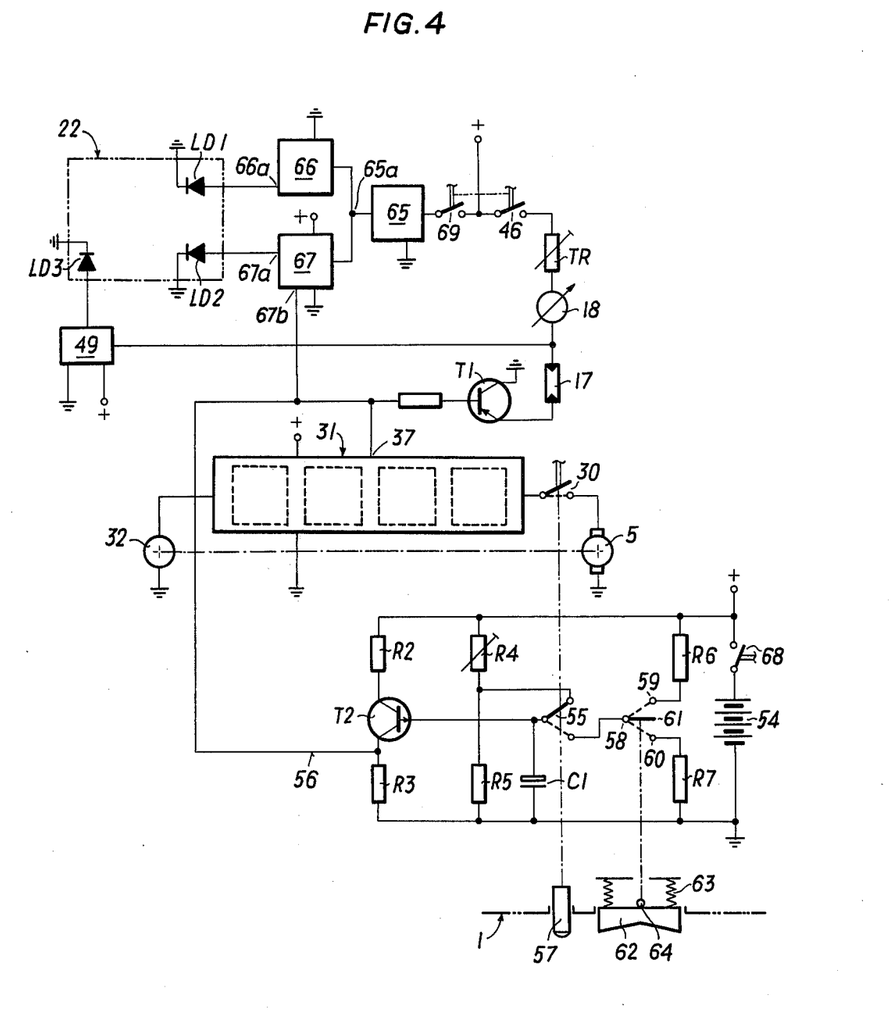
FIG. 4 shows a third embodiment of the electronic circuit incorporated in the motion picture camera of FIG. 1, the indication of the picture frequency being obtained by means of light sources.

FIG. 4 shows a third embodiment of the electronic system of the invention for shooting trick pictures such as time-lapse pictures, slow-motion pictures, etc. Just as in the embodiment of FIG. 3, a speed control device 31 has been provided for the film transport motor 5. The tachogenerator 32 is mechanically coupled with the shaft of the driving motor 5. For the adjustment of the diaphragm, a diaphragm regulating circuit with the photoconductive cell 17, the galvanometer 18, an adjustable resistance TR, and a transistor T1 are provided. The control of the speed regulating device takes place by way of a nominal voltage which is supplied to the speed regulating device 31 through the connection 37. This nominal voltage is also supplied to the electrode of transistor T1 as a control voltage to act upon the diaphragm regulating circuit.

The function of the speed control device and of the diaphragm regulating circuit is substantially identical to that of the described with reference to the embodiment of functional steps in FIG. 3. However, unlike the embodiment of FIG. 3, a nominal-voltage transmitter that consists solely of electronic components, is used in the embodiment of FIG. 4. This nominal-voltage transmitter consists of a voltage divider R2 and R3. The voltage divider is connected with the operating voltage source 54. A storage capacitor C1 is connected to the base electrode of transistor T2. Likewise, the voltage tap of an additional voltage divider consisting of resistances R4, R5 is connected with the base electrode by way of switch 55. As a result, the condenser C1 is charged with a voltage that is determined by the resistances R4 and R5. By connecting a voltage that is positive with respect to ground to the base electrode of transistor T2, the resistance between the emitter and collector of transistor T2 is increased. This transistor T2 acts, for that reason, as a variable resistance in the series resistances of voltage divider R2, R3.

In accordance with the amount of voltage at the condenser C1, a variable voltage is available at tap 56 of voltage divider R2, R3 and this voltage is supplied, as nominal voltage, to the speed control device 31 and/or to the diaphragm regulating circuit. With selected values for the resistances R4 and R5, a voltage is set at voltage tap 56 which is identical with the nominal voltage of a normal picture frequency. The diaphragm regulating circuit is controlled in the same way. In FIG. 5, the voltage at voltage tap 56 has been shown with respect to picture frequency. It may seem from the diagram that, in the case of a normal picture frequency of 18 pictures/second a nominal control voltage of two volts is supplied to the speed control device. For time-lapse pictures, a minimum of 9 pictures/second may be selected, the corresponding control voltage being one volt. For slow-motion pictures with a maximum of 36 pictures/second, a control voltage of three volts is required.

In order to be able to obtain trick pictures during the shooting of a sequence, the fixed voltage divider R4, R5 is separated from the condenser C1 by reversing the switch 55 that is coupled with the release knob 30. Now, the condenser C1 maintains the potential on the base electrode of transistor T2. When the field-effect transistor T2 is of the type referred to as a MOS-FET, a relatively small capacitance for the condenser C1 will be sufficient to maintain the voltage at the base electrode for four to five minutes. This span of four to five minutes is quite sufficient, inasmuch as commercial film cassettes for narrow film cameras allow only a short shooting period. However, in order to set the picture frequency before the actuation of the camera release, a lever 57 has been mounted on the camera for the control of switch 55. After actuation of the lever 57 (trick key) or of the release, the voltage potential at the base electrode of transistor T2 may be modified through an additional selector switch 58. The switch 58 has two operating contacts 59, 60 and a no contact mid-position 61. The contact 58 is connected, by way of a resistance R6 preferably of a high ohmic value with a positive voltage potential, and the contact 60 is connected by way of a resistance R7 with a negative voltage potential. When, the contact 59 is closed, the condenser C1 will gradually be charged to a higher voltage. In this way, the resistance of the emitter-collector of transistor T2 is increased, while the voltage on tap 56 is reduced. Similarly, a closing of contact 60 leads to a gradual lowering of the voltage on condenser C1 by way of the resistance R7 also preferably of a high ohmic value.

In this way, the resistance value of the emitter-collector of transistor T2 is reduced, and the voltage on tap 56 is increased. By means of switch 58, which is preferably of a push button type, any desired picture frequency within the range from 9 to 36 pictures/second can be set by purely electronic means. The condenser C1 stores the control voltage for the transistor T2 over a sufficiently long period of time. If it is desired, to achieve time-lapse effects, even during the shooting, without interruption the contact 60 need only be closed whereby the condenser C1 is discharged. This condenser C1 will be discharged as long as the pushbutton 58 closes the contact 60. When the desired picture frequency has been attained, the push button 58 is released again. The voltage on condenser C1 at the moment of the release of push button 58 will be maintained. A switching lever 62 that may be pivoted around the axis 64 against the tension of spring 63 provided for the operation of the switch or push button 58.

To indicate the picture frequencies, two luminous diodes LD1, LD2, are visible in the viewfinder image 22. To control these luminous diodes LD1, LD2, a non-stable multivibrator 65 has been provided which can be switched on by turning the switch 46 for activating the diaphragm regulating circuit. For this purpose, the switch 68 in the voltage supply circuit of the non-stable multivibrator 65 is mechanically connected to switch 46 of the diaphragm regulating circuit. The non-stable multivibrator 65 has been provided as a pulse generator for control of the mono-stable multivibrator 66. Luminous diode LD1 has been connected at the output 66a of the monostable multivibrator 66. The impulse wave front at the output 65a of the non-stable multivibrator 65 causes the monostable multivibrator 66 to pivot whereby the luminous diode LD1 lights up. The dimensions of the multivibrator 66 are such that its first dwelling time in the non-stable state is identical to one-half the duration of the period of the pulse generator or multivibrator 65. The additional monostable multivibrator 67 which is also connected at the output 65a of the non-stable multivibrator 65, controls the luminous diode LD2. This monostable multivibrator 67 has been designed in such a way that the dwell time in the non-stable state may be adjusted through its control input 67b. This may be done in such a way that the resistance of the resistance-capacitance component that determines the dwell time is provided by the emitter-collector of a transistor, whose base electrode is connected to the control input 67b. The nominal voltage for the speed control device 31 is fed, as a control voltage to the monostable multivibrator 67 for influencing dwell time in the non-stable state. In this example, the monostable multivibrator 67 has been designed in such a way that a high nominal voltage or high picture frequency will bring about a long dwell time in the non-stable state and a low nominal voltage or low picture frequency will bring about a short dwell time in the non-stable state.

With reference to the diagrams of FIGS. 6a to 6c, the mode of operation and the type of indication of the picture frequencies to the user of the camera is discussed below. The luminous diode LD1 indicates normal picture frequency. Let us assume that the non-stable multivibrator has an oscillation frequency in cycles per second. As described above, the monostable multivibrator 66 has a dwell time amounting to half the duration of the period of the non-stable multivibrator 65. For that reason, the luminous diode LD1 is addressed and made to light up as may be seen in FIG. 6a. Now, if the nominal voltage on tap 56 of the voltage divider R2/R3/T2 shows a value that corresponds to the normal picture frequency, the additional monostable multivibrator 67 also will have a dwell time that is equal to half the duration of the period of the non-stable multivibrator 66. Then the luminous diode LD2 will be addressed and made to light up at the same moment and for the same time as the luminous diode LD1. Upon selecting a higher picture frequency by actuating the "trick-key" 57 and the switching lever 62 which requires a rise in the nominal voltage on tap 56 of the voltage divider R2/R3/T2, then the dwell time of the monostable multivibrator 67 in the non-stable state will be prolonged by the modification of the voltage on its control input 67b, in comparison to the dwell time of the monostable multivibrator 66. The luminous diode LD2 will emit light that much longer than the luminous diode LD1, as the speed selected is higher than the speed for normal picture frequency as seen in FIG. 6b. Consequently, the user of the motion picture camera will be able to discover in a simple way that a "stretching" of the processes of motion or slow motion will occur when he projects the motion picture film he has taken.

In a manner analogous to that described above, a reduction of the speed of the driving motor 5 by reducing the nominal voltage on tap 56 of the voltage divider R2/R3/T2 brings about a shortening of the dwell time of the monostable multivibrator in the non-stable state. This results in a shorter addressing of the luminous diode LD2 as compared to the luminous diode LD1. Since in this case too, the luminous diodes LD1 and LD2 are always switched on at the same time, the luminous diode LD2 will then emit light for a shorter time, a time that grows shorter as the speed of the driving motor 5 differs from the speed for normal picture frequency and the user of the camera will again be able easily to discover that he has selected a speed which upon projecting the exposed film will cause a "time lapse", that is, a shortening of the motion sequences. The appropriate diagram of the switch-on duration of switch-on times for time-lapse sequences, as compared to normal-time ones may be seen from the diagram in FIG. 6c.

It should be pointed out that the cycle of the non-stable multivibrator 65 must be suitably chosen so that the pulses on output 65a of the non-stable multivibrator are shorter than or at most equal to, the shortest dwell time of the mono-stable multivibrator 67 in the non-stable state.

Number 68 designates the switch provided as the principal switch for the entire energy supply of the electronic system of the camera. The diaphragm regulating circuit is actuated by switch 46 and, at the same time, activates switch 68, the non-stable multivibrator 65, the monostable multivibrator 66, and the luminous diode LD1.

Now the user of the camera is able to determine that his camera is ready for use. The flashing of the luminous diode LD1 indicates to him that the diaphragm-adjusting circuit has been actuated and that the camera is set at normal picture frequency. If the user desires to set the camera before he actuates the release for a picture frequency to take trick shots, slow motion, time lapse, etc., he will actuate the control 57 thereby influencing voltage divider R2/R3/T2 so that any desired nominal voltage may be obtained for the speed control device 31, by means of lever switch 62. Control 57 has been designed in such a way that when releasing the release lever, it will return to its normal position.

Finally, as in the design in FIG. 3, a circuit for a warning signal relating to underexposures has been provided. A threshold value switch 49 is provided, the control input of which is connected with a voltage tap of the diaphragm adjusting circuit including photoconductive cell 17 and galvanometer 18. At the output of the threshold value switch 49, a luminous diode LD3 has been connected, which indicates to the user, by lighting-up, that when the diaphragm is opened completely by the galvanometer 18, a proper exposure of the film cannot be achieved because of insufficient brightness of the scene at the picture frequency selected. When the diode LD3 lights up, the user will reduce the picture frequency by actuation of the lever switch 62 until the luminous diode LD3 goes off again.

A use of constant power sources for charging or discharging the condenser C1 instead of resistances R6, R7 makes possible a linear rise or a linear drop of the voltage on the condenser C1 with respect to time.

Figure 7:
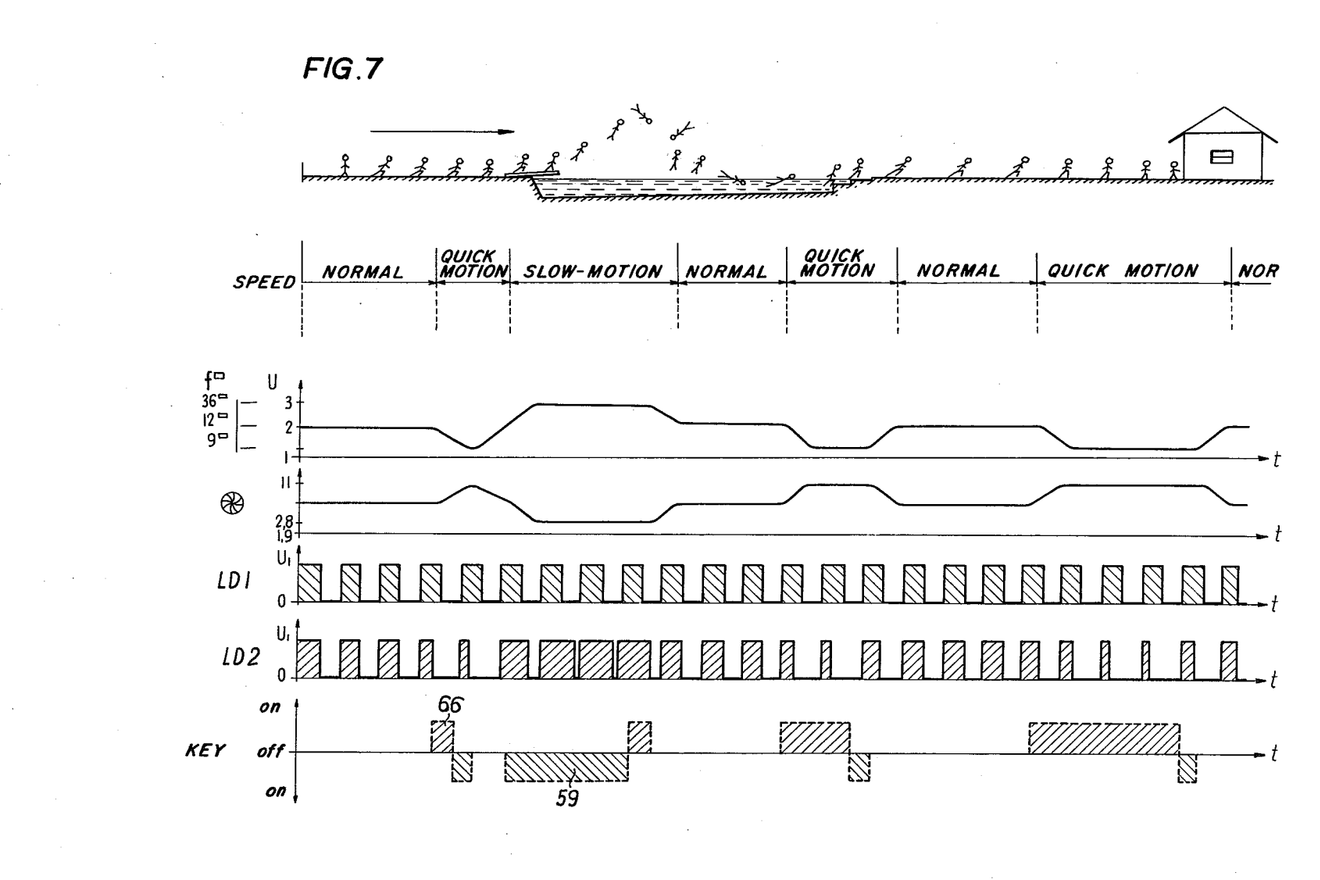
FIG. 7 is a diagrammatic illustration of a sequence of scenes for photographing with the camera of the invention.

Finally, FIG. 7 shows in diagram form the operation of electronic system of a motion picture camera using a nominal voltage transmitter in accordance with FIG. 4, a classical example of design for trick photography. The sequence to be shot present a jumper. In the various diagrams, the pertinent picture frequencies, aperture values, nominal voltage values for the speed control device of the driving motor, the light emission time of the luminous diodes, and the actuation of the push buttons 60, 59, are shown in accordance with FIG. 4, for the various types of photography, that is, normal speed, slow-motion speed, and time-lapse speed.

What is claimed is:

1. A motion picture camera comprising, in combination, a film transport mechanism, an electric motor for driving said film transport mechanism, an automatic aperture control circuit, an electronic speed control circuit for said motor, a first actuatable adjusting element which during actuation conditions said electrical speed control to increase continuously the speed of said motor to a first selected speed level, a second actuatable adjusting element which during actuation conditions said electrical speed control to decrease continuously the speed of said motor to a second selected speed level, means in said speed control circuit for resetting said motor speed to said normal film transport speed when the operation of said camera is terminated, and a picture frequency indicator for displaying the selected picture frequency accessible to the camera operator at least during the operation of the camera.

2. A motion picture camer in accordance with claim 1 wherein said electronic speed control circuit includes a control signal transmitter and wherein said adjustment elements are arranged to actuate said control signal transmitter, said control signal transmitter being arranged to produce output signals corresponding to both higher and lower picture frequencies with respect to said normal picture frequency.

3. A motion picture camera in accordance with claim 2 wherein said control transmitter output signals are in the form of relatively high, DC voltages and including means for supplying said DC voltages to said electronic speed control circuit for controlling the speed of said motor.

4. A motion picture camera in accordance with claim 2 wherein said control signal transmitter comprises a potentiometer, means for connecting said potentiometer with an associated DC voltage source, said potentiometer including a movable contract and an output tap connected to the input of said speed control circuit, an electro-mechanical driving means for adjustably moving said potentiometer contact.

5. A motion picture camera in accordance with claim 4 wherein said electro-mechanical driving means comprises a friction gear, an electric motor drivably connected to said friction gear and coupling means for connecting said gear drive motor to said gear for driving said gear selectively in opposite directions.

6. A motion picture camera in accordance with claim 5 wherein said friction gear, drive motor, and said film transport mechanism drive motor comprise a single motor.

7. A motion picture camera in accordance with claim 4 including a lever connected to said potentiometer contact for manual adjustment of said potentiometer contact.

8. A motion picture camera in accordance with claim 4 wherein said electro-mechanical driving means includes an electric motor, a speed reduction gear connected to said electric motor, said reduction gear being connected to said contact, a pair of manually actuated contact keys for selectively controlling the movement of said contact in opposite directions, and an electric relay having a break contact serially connected with one of said key contacts for indirectly increasing the picture frequency, said relay connected in electric parallel relationship with the other key contact for producing a reduction in said picture frequency, a threshold value switch having a control input, means for connecting said threshold value switch to said relay and means for connecting said threshold value switch control input to said automatic aperture control circuit.

9. A motion picture camera in accordance with claim 3 wherein said control signal transmitter comprises a variable voltage divider connected to an associated DC voltage source, at least one fixed resistance, a field-effect transistor having a variable source-drain resistance, a storage condenser connected to the gate electrode of said field-effect transistor, a fixed voltage divider for establishing the normal picture frequency and for applying a predetermined voltage potential to said reservoir condenser at least when the operation of the camera has been terminated.

10. A motion picture camera in accordance with claim 9 including associated power sources of opposite polarity for selective connection to said reservoir condenser subsequent to the disconnection of said reservoir condenser from said fixed voltage divider.

11. A motion picture camera in accordance with claim 10 including a circuit breaker connected between said storage condenser and said fixed voltage divider, said circuit breaker being actuated by the release lever on the camera.

12. A motion picture camera in accordance with claim 10 wherein said adjustment elements comprise push-buttons and wherein said push-buttons are arranged to connect said associated power sources of opposite polarity to said storage condenser.

13. A motion picture camera in accordance with claim 1 including means responsive to the speed of said film transport mechanism motor for producing an electric signal, and means for applying said electric signal produced in response to the speed of said film transport mechanism motor to said automatic aperture control circuit.

14. A motion picture camera in accordance with claim 1 including a focal length adjusting device for the photographic lens of the camera including means responsive to the speed of said film transport mechanism motor for producing an electric signal and means for applying said electric signal produced in response to the speed of said film transport mechanism motor to said focal-length adjusting device.

15. A motion picture camera in accordance with claim 1 including picture frequency indicating means mounted in the path of the rays of the camera's viewfinder, and means for producing an electrical signal in accordance with the speed of said film transport mechanism motor and means for applying said electrical signal produced in response to the speed of said film transport mechanism to said picture frequency indicating means.

16. A motion picture camera in accordance with claim 15 including at least one luminous diode responsive to an electric signal and wherein said picture frequency indicating means includes an electronic pulse generator having two monostable multivibrator stages connected with its beat output, means for connecting the output of said electronic pulse generator to said luminous diode and means for controlling the dwell time of the monostable multivibrator stages of said electronic pulse generator in response to the electrical signal corresponding to the speed of said film transport mechanism motor.

17. A motion picture camera in accordance with claim 16 wherein said electronic pulse generator includes means for maintaining the dwell time of both said monostable multivibrator stages at the same level at normal picture frequency.

* * * * *